United States Patent Office 2,961,452
Patented Nov. 22, 1960

2,961,452

TERPENE PRIMARY ALCOHOLS

Ralph A. Raphael, Glasgow, Scotland, assignor to The Glidden Company, Cleveland, Ohio, a corporation of Ohio No Drawing. Filed Dec. 9, 1957, Ser. No. 701,306

15 Claims. (Cl. 260—448)

This invention relates to a novel process for the preparation of citronellol. The invention is more specifically directed to a process for preparing citronellol readily and inexpensively by the employment of an acyclic diene of the terpene series, namely, 2,6-dimethyl-2,7-octadiene as the starting material.

In the past decade or so trialkyl aluminums have been found to be excellent polymerization catalysts for mono-olefinic hydrocarbons, and also aluminum compounds such as lithium aluminum hydride have been found to be good reducing agents for reducible groups. Exemplary of the groups which can be reduced by lithium aluminum hydride are carbonyl, carbalkoxy, acyl chloride and nitro groups. Aluminum itself is known to form a compound, aluminum hydride ($AlH_3$) which has heretofore been found to react with mono-olefins with saturation of the double bond and the formation of the trialkyl aluminums.

The best known reaction of an organometallo aluminum has been that wherein a trialkyl aluminum, for example triethyl aluminum, has been employed as a catalyst for the polymerization of ethylene. Also, aluminum alkyls have been used for the dimerization of unsaturated hydrocarbons, but in these cases, as with the majority of the reactions heretofore reported, the hydrocarbons dimerized are those of the type containing the unsaturation in the α position. The treatment of mono-olefins containing the unsaturation internally, for example, in the number 2 or 3 carbon atom with a trialkyl aluminum, has also been reported (see U.S. Patent 2,695,327) but in these cases it has been reported that the double bond migrates under the influence of the organometallic compound to the α position.

The majority of work with the trialkyl aluminum compounds has heretofore been directed to the treatment of α-monounsaturated olefinic materials preponderantly those of not more than about 7 carbon atoms. As will be brought out hereinafter, my invention relates to a process for preparing citronellol, an unsaturated acyclic alcohol of the terpene series from an acyclic diene, 2,6-dimethyl-2,7-octadiene.

Citronellol, a $C_{10}$ terpene alcohol, 2,6-dimethyl-2-octene-8-ol also known as 3,7-dimethyl-6-octenol, is a valuable terpene alcohol per se and also as an intermediate in the manufacture of 1-methol. It is an oily liquid with an odor of rose for which the following physical characteristics have been reported:

$d^{15}$ 0.850–0.857, b. 220° C., $n_d^{20}$ 1.4566

Citronellol is very slightly soluble in water and miscible with alcohol and ether. Methods of preparing citronellol include by the action of sodium amalgam on the aldehyde citronellal and from various volatile oils, e.g., geranium, rose, etc. These processes are, however, expensive and in view of the value of citronellol it would be highly desirable to obtain it by a cheaper process from readily available raw materials.

In accordance with the foregoing an object of my invention is the preparation of citronellol from a readily available raw material.

A further object of my invention is the provision of a process for the conversion of 2,6-dimethyl-2,7-octadiene to citronellol.

A still further object of my invention is the provision of novel intermediates suitable for conversion to citronellol.

Other objects will be apparent from a description of my invention which follows.

In accordance with the foregoing I have found that I can convert 2,6-dimethyl-2,7-octadiene to citronellol by a process which comprises contacting aluminum hydride with 2,6-dimethyl-2,7-octadiene, oxidizing the resulting trialkenyl aluminum and hydrolyzing the oxidized product to obtain the alcohol. The process of my invention also includes the preparation of citronellol by treating 2,6-dimethyl-2,7-octadiene with a suitable trialkyl aluminum compound such as triisobutyl aluminum. In this instance the reaction involves the displacement of the isobutyl groups with the octadiene hydrocarbon to yield the trialkenyl aluminum. Other trialkyl aluminum compounds can be employed if the olefin to be displaced corresponds to the structure of isobutylene as shown in French Patent 1,134,878. Trialkyl aluminum compounds wherein the alkene hydrocarbon employed for the reaction possesses the following structure, are suitable:

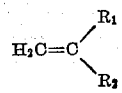

where $R_1$ and $R_2$ are hydrocarbon radicals.

In essence my invention is predicated upon the fact that an acyclic diene, 2,6-dimethyl-2,7-octadiene, can be treated with aluminum hydride or trialkyl aluminum as defined above, to yield an unsaturated trialkyl aluminum compound and the trialkenyl aluminum compound then oxidized and hydrolyzed to produce the desired alcohol, citronellol.

Actually, in view of the prior art, the results of my invention were unexpected. As will be demonstrated, under the conditions of my invention an unsaturated alcohol, citronellol, is the resulting product from the treatment of aluminum hydride.

In the preferred embodiment of my invention I contact aluminum hydride (a solid) in an ether solution and in an inert atmosphere with 2,6-dimethyl-2,7-octadiene, preferably at temperatures above room temperature, to obtain a tricitronellyl aluminum and thereafter oxidize and hydrolyze the trialkenyl alumnnum and recover the desired citronellol compound. The aluminum hydride can be generated in the reaction system in accordance with the preferred embodiment of my invention.

As indicated, aluminum hydride can be employed in an ethereal solution and it can be generated in the reaction system in situ by the treatment of an aluminum compound with a reagent capable of generating it. The following are methods which are known to the prior art for the preparation of aluminum hydride:

(1) Lithium aluminum hydride is treated with an ether solution of aluminum chloride to yield an ethereal solution of aluminum hydride. The yield in this reaction is over 90%.

(2) Lithium hydride is substituted for the lithium aluminum hydride of Method 1 to obtain a yield of about 85% of aluminum hydride.

Method 1 is preferred because it proceeds more rapidly and smoother. See J.A.C.S. 69, 1202, 1947.

I have successfully employed lithium aluminum hydride and anhydrous aluminum chloride as described in Method 1 above for the preparation of the desired aluminum hydride.

From what has been stated, it can be seen that methods for preparing aluminum hydride are known, and I do not intend to limit my invention to any specific methods disclosed.

The other reactant component of the process of my invention, 2,6-dimethyl-2,7-octadiene, can be obtained readily from American turpentine, for example. Essentially, starting with the abundant material, turpentine, there can be obtained α pinene which, upon hydrogenation with, for example, a Raney nickel catalyst, will yield pinane. Pinane can thereafter be pyrolyzed in the presence of a mildly acidic catalyst, desirably on the surface of an absorbent such as pumice, at temperatures of from 400 to 700° C. to yield a mixture comprising 2,6-dimethyl-2,7-octadiene which can be recovered therefrom by fractional distillation. A fraction of 2,6-dimethyl-2,7-octadiene was obtained having the following properties: $d_4^{25}$ 0.7583, $n_d^{25}$ 1.4363, $[\alpha]_d^{25}$—7.91 and b. 94.5/100 mm. Any known method for obtaining 2,6-dimethyl-2,7-octadiene can be employed, however. It should be pointed out that I prefer to start with a diene produced from an optically active pinane, obtained from β-pinene found in American turpentine using a nickel catalyst to obtain an optically active citronellol. The citronellol can be dehydrogenated to optically active citronellal, a precursor of optically active l-menthol using the well known process involving cyclization of citronellal to isopulegol, then dehydrogenating the latter to menthol. From what has been stated above it will be recognized that I provide a process for producing an inexpensive and valuable p-menthane alcohol possessing organoleptic properties by a procedure which is simple and employs readily available cheap and abundant raw materials.

The oxidation of the tricitronellyl aluminum can be accomplished with known oxidizing agents, for example, air or oxygen. I presently prefer to employ a stream of dry air to obtain the tricitronellyl aluminate. The resulting tricitronellyl aluminate can thereafter be simply treated with water to obtain the alcohol, citronellol, in satisfactory yields.

In that embodiment of my invention wherein I generate aluminum hydride in situ, I employ an ether solvent to facilitate its preparation. Thus, where aluminum hydride is generated from lithium aluminum hydride and anhydrous aluminum chloride, I employ diethyl ether as a solvent. Other solvents that are applicable are tetrahydrofuran, diethylene glycol dimethyl ether (diglyme), etc.

Although I can carry out the reaction of aluminum hydride and 2,6-dimethyl-2,7-octadiene at room temperature, I prefer to employ higher temperatures, for example, from 55° to 160° C. to accelerate the reaction. The resulting tricitronellyl aluminum can thereafter be oxidized and hydrolyzed by treatment with water in a suitable vessel as will be shown in my specific example.

In general, then, my invention resides essentially in the following reaction:

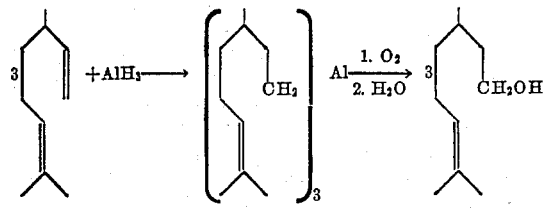

The following example illustrates the process of my invention. It should be understood that various modifications can be made therein by the employment of equivalents and the like.

A flame-dried three-necked flask which was equipped with stirrer, addition funnel, condenser and gas inlet tube was flushed with dry nitrogen. The flask was charged with 10.5 gms. of lithium aluminum hydride and 150 cc. of absolute ether. To the stirred material was added 11.05 gms. of anhydrous aluminum chloride. After stirring for two hours, the mixture was allowed to stand overnight (nitrogen atmosphere). To the suspension was added 138 gms. of 2,6-dimethyl-2,7-octadiene over a period of fifteen minutes. The reaction mixture was heated and stirred on a steam bath for two hours. After standing overnight (nitrogen atmosphere), the suspension was filtered through a filter stick with nitrogen pressure. The ethereal solution was passed over a bed of glass Raschig rings contained in a tube ca. 12" in length and 1" in diameter while passing counter-current a stream of dry air. The eluate was treated with water and ether extracted. After drying and concentration of the ether, the residue was distilled in a Claisen flask. The material boiling at 110–115°/20 mm. possessed the characteristic odor of citronellol. The vapor phase chromatographic analysis and infrared pattern were consistent for citronellol and matched curves of known samples.

Another procedure is as follows:

A mixture of two parts by weight of tri-isobutyl aluminum and one part by weight of 2,6-dimethyl-2,7-octadiene with a sufficient quantity of dry benzene to give a boiling point of 110° C. is heated at reflux in a round bottomed flask equipped with a condenser after first replacing the air with nitrogen. The mixture is boiled for several hours, the temperature in the flask being maintained at about 110° by the periodic addition of further quantities of benzene. The liberated isobutene is allowed to pass through the reflux condenser and is subsequently recovered. Upon distilling the benzene under moderated reduced pressure after the liberation or formation of isobutene ceases the tricitronellyl aluminum remains in the oily liquid residue. Air oxidation and hydrolysis of the residue yields citronellol. Alternatively the benzene solution can itself be used for the oxidation treatment.

As indicated above the yields of citronellol can be readily ascertained by infrared analysis. Other physical or chemical means, however, will be apparent to the skilled chemist.

The citronellol prepared by the reactions described above can be recovered suitably by distillation as indicated or by steam distillation of the crude citronellol.

Although my invention has been described with reference to the production of citronellol it is believed that the intermediate aluminum compounds formed, that is, tricitronellyl aluminum and tricitronellyl aluminate or in the Geneva system for nomenclature of these compounds tri (3,7-dimethyl-6-octen-1-yl) aluminum and tri (3,7-dimethyl-6-octen-1-yl) aluminate respectively, are new. As noted, however, I need not separate or recover the intermediates and the oxidation and hydrolysis of the material can be performed on the tricitronellyl aluminum solution as shown.

Resort can be had to modifications and equivalents falling within the scope of my invention and the appended claims.

Having thus described my invention, I claim:

1. A process for preparing citronellol which comprises contacting 2,6-dimethyl-2,7-octadiene with aluminum hydride at a temperature from about room temperature to about 160° C. and oxidizing and hydrolyzing the resulting trialkenyl aluminum.

2. A process according to claim 1 wherein the aluminum hydride is generated in situ in the reaction system.

3. A process for preparing citronellol which comprises treating 2,6-dimethyl-2,7-octadiene with the compound aluminum hydride, said treatment being carried out in an ether solvent for the reactants at a temperature above about room temperature to about 160° C. and oxidizing and hydrolyzing the resulting reaction product.

4. A process according to claim 3 wherein the oxidation is carried out with air and the hydrolysis with water.

5. A process for preparing citronellol which comprises treating 2,6-dimethyl-2,7-octadiene with aluminum hydride, said treatment being carried out in an ether solvent for the reactants at a temperature above about room temperature to about 160° C., oxidizing and hydrolyzing the resulting reaction product and thereafter recovering said citronellol.

6. A process according to claim 5 wherein the reactants are heated to a temperature of from about 55° to 160° C.

7. A process according to claim 5 wherein the solvent for the reactants is diethyl ether.

8. A process according to claim 5 wherein the aluminum hydride is generated in situ in the reaction system.

9. A process which comprises treating 2,6-dimethyl-2,7-octadiene with aluminum hydride at a temperature of from about room temperature to about 160° C., oxidizing and hydrolyzing the resulting product, said oxidation being carried out with air and said hydrolysis with water and recovering from said hydrolysis reaction citronellol.

10. Tri (3,7-dimethyl-6-octen-1-yl) aluminum.

11. Tri (3,7-dimethyl-6-octen-1-yl) aluminate.

12. A method for preparing tricitronellyl aluminum which comprises treating 2,6-dimethyl-2,7-octadiene with aluminum hydride at a temperature from about room temperature to about 160° C.

13. A method of preparing tricitronellyl aluminate which comprises treating 2,6-dimethyl-2,7-octadiene with aluminum hydride at a temperature from about room temperature to about 160° C. and thereafter oxidizing said aluminate.

14. A process for preparing citronellol which comprises treating 2,6-dimethyl-2,7-octadiene with an aluminum trialkyl wherein the alkene groups used in preparing said aluminum trialkyl correspond to the following structure:

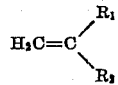

where $R_1$ and $R_2$ are hydrocarbon radicals, and oxidizing and hydrolyzing the resulting trialkenyl aluminum.

15. A process for preparing citronellol which comprises converting 2,6-dimethyl-2,7-octadiene to tricitronellyl aluminum by contacting the diene with a compound of the formula $AlR_3$ in which R is a group selected from the class consisting of hydrogen and a monovalent radical of the formula

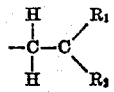

in which $R_1$ and $R_2$ are hydrocarbon radicals, converting the tricitronellyl aluminum to the corresponding tricitronellyl aluminate by oxidizing the same with a gaseous oxygen oxidizing agent and hydrolyzing the tricitronellyl aluminate to form citronellol.

References Cited in the file of this patent
UNITED STATES PATENTS

| | | |
|---|---|---|
| 2,826,598 | Ziegler et al. | Mar. 11, 1958 |
| 2,835,689 | Ziegler et al. | May 20, 1958 |

OTHER REFERENCES

Fieser et al.: Organic Chemistry, 2nd edition, page 1016 (1950).

Gortner: Outlines of Biochemistry, 3rd edition, (1950), pp. 837 and 838.

Ziegler et al.: Angewandte Chemie, vol. 67 (1955), pp. 424 to 426.